March 31, 1931.  G. H. HUFFERD ET AL  1,799,141
TIE ROD BALL JOINT
Filed Dec. 8, 1927
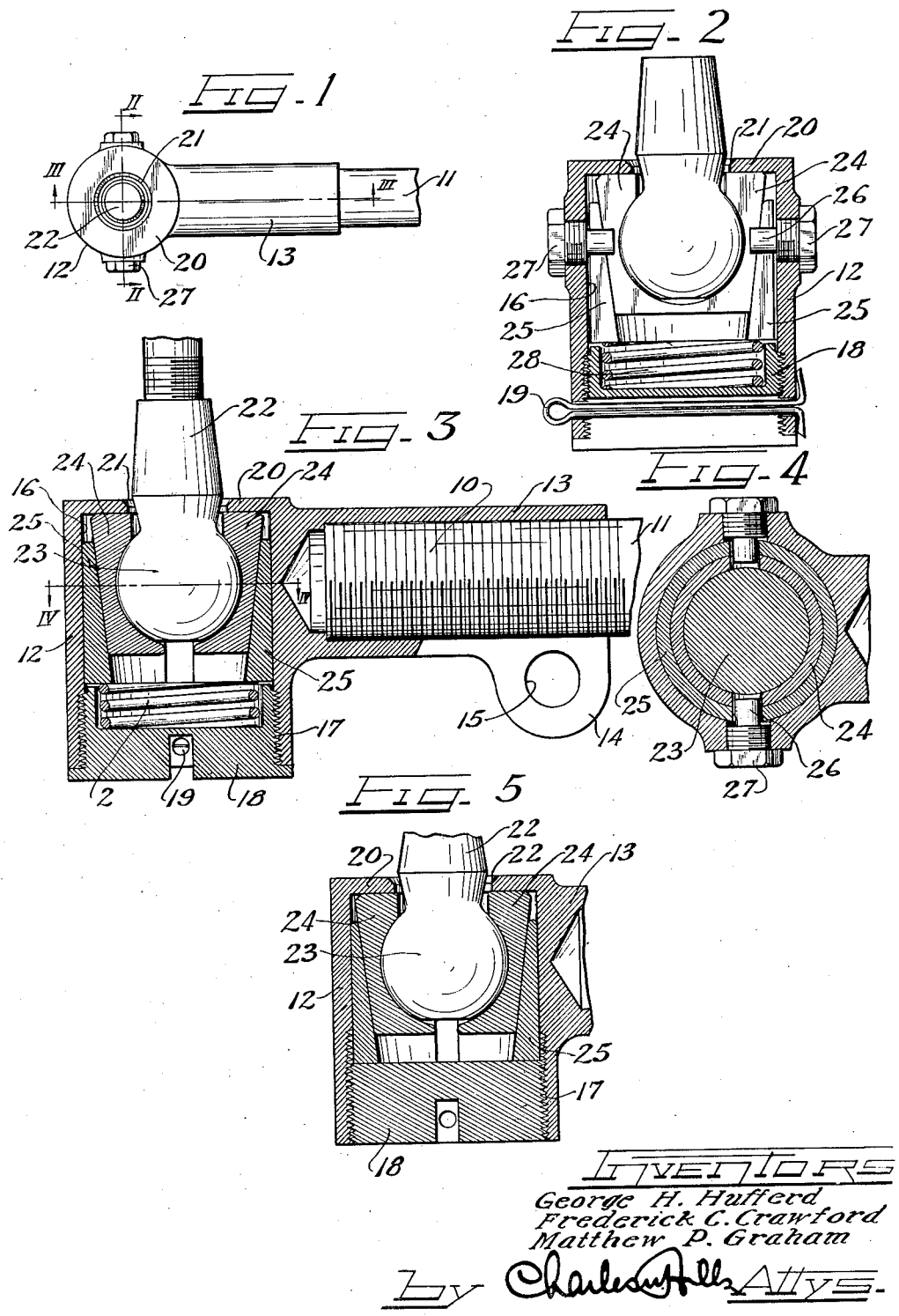

Patented Mar. 31, 1931

1,799,141

UNITED STATES PATENT OFFICE

GEORGE H. HUFFERD, FREDERICK C. CRAWFORD, AND MATTHEW P. GRAHAM, OF DETROIT, MICHIGAN, ASSIGNORS TO THOMPSON PRODUCTS, INC., OF CLEVELAND, OHIO, A CORPORATION OF OHIO

TIE-ROD BALL JOINT

Application filed December 8, 1927. Serial No. 238,484.

This invention relates to an improved form of adjustable ball joint connection for the tie rods and drag links used in the steering mechanism of automotive vehicles.

The general object of this invention is to provide an improved ball joint connection that is adjustable to compensate for wear without the adjustment affecting the alignment of the ball thrust with the tie rod axis in either a horizontal or vertical direction.

It is also an object of this invention to provide an improved ball joint connection that will be compact and hence have minimum end clearance; safe, simple, durable, easily assembled and cheaply manufactured.

It is another object of this invention to provide an improved form of ball joint connection wherein a cylindrical inverted cup shaped housing is adapted to contain adjustable tapered sleeves within which are ball seat members having correspondingly tapered outer surfaces, the ball seat members abutting against the end of the housing so that an adjustment for wear will not affect the alignment of the ball stud with the axis of the tie rod.

It is still another object of this invention to provide an improved form of ball joint connection having an automatic adjustment for wear wherein failure of the adjusting means will not result in release of the ball stud from the housing.

Other and further objects of this invention will be apparent from the disclosures in the specification and the accompanying drawings.

This invention (in a preferred form) is illustrated in the drawings and hereinafter more fully described.

On the drawings:

Figure 1 is a plan view of a ball joint connection embodying the features of this invention.

Figure 2 is an enlarged section on the line II—II of Figure 1.

Figure 3 is an enlarged section on the line III—III of Figure 1.

Figure 4 is a section on the line IV—IV of Figure 3.

Figure 5 is a section corresponding to Figure 3 wherein a manual adjustment for wear is disclosed.

As shown on the drawings:

The threaded end 10 of a tie rod 11 is shown in the drawings in connection with a cylindrical housing 12 having a threaded sleeve 13 engaging the tie rod, the end of the sleeve being slit and provided with opposing lugs 14 with holes 15 for a clamping bolt which is not shown on the drawings. The housing 12 is formed as an inverted cup having a cylindrical bore 16 terminating at the bottom in a threaded portion 17 which receives a plug 18, the housing and plug being formed to receive a cotter pin 19.

The closed top 20 of the cup-like housing is centrally apertured at 21 for the stem 22 of a ball stud 23, the aperture 21 being too small to pass the ball 23 so that the shank must be pushed up through the bottom of the housing 12.

The ball 23 rests between hardened ball seat members 24 comprising inner semi-spherical surfaces forming a bearing enveloping the ball and outer inverted frusto-conical surfaces; the big ends of the ball seat members bearing against the closed top 21 of the housing. A pair of sleeve-like semi-circular segments 25 are formed with cylindrical outer surfaces fitting within the cylindrical bore 17 of the housing, the inner surfaces having a frusto-conical form complementary to the outer surface of the ball seat members 23. These segments are so formed that considerable upward movement is possible within the limits of the housing bore, it being evident that such movement will force the ball seat members inwardly against the ball and take up any play in the bearing.

The wedge-like segments 25 and the ball seat members 24 are spaced apart to receive therebetween the ends 26 of set screws 27 threaded through the side wall of the housing 12. The particular form of these set screws or pins is not important, as their purpose is to prevent rotation of the ball seat members. Such movement, if not prevented, would shift the bearing surfaces which are intended to be aligned with the direction of the tie rod thrust.

The foregoing description applies equally to both illustrated embodiments of the invention. In Figures 1 to 4, the plug 18 is recessed to receive the lower end of a coil spring 28, the upper end of which pushes against the bottom edges of the wedge-like segments 25, thus providing an automatic take-up which maintains the bearing surfaces in proper contact regardless of wear, while at the same time eliminating the possibility of excessive manual adjustment that would bind the bearing.

The modification of Figure 5 eliminates the spring 28, the top of the plug 18 bearing against the bottom of the wedge-like segments 25 so that a manual adjustment of the plug forces the segments 25 upwardly to take up any looseness in the bearing.

The ball joint connection is assembled by placing the ball seat members 24 and the segments 25 about the ball 23 and sliding the whole assembly into the housing from the bottom, the shank of the ball stud passing through the aperture 21 and projecting above the housing for attachment to the steering arm.

It will be seen that we have provided an improved form of ball joint connection that will be simple and cheap to manufacture, and that will be rigid and durable in service, maintaining accurate alignment and wheel spacing throughout its range of adjustment for wear.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A ball joint connection comprising a ball stud having a shank smaller than the ball, a housing having a cylindrical bore and an apertured end closure, the aperture being sufficiently large only to admit the shank of said ball stud, ball seat members in said housing having frusto-conical outer surfaces, wedge-like segments having inner frusto-conical surfaces complementary to those of the ball seat members and an outer cylindrical surface fitting within the bore of said housing, and means for longitudinally shifting said wedge-like segments relative to said ball seat members to compensate for wear.

2. A ball joint connection comprising a ball stud having a shank smaller than the ball, a housing having a cylindrical bore threaded at one end and an apertured end closure, the aperture being sufficiently large only to admit the shank of said ball stud, ball seat members in said housing having frusto-conical outer surfaces, wedge-like segments having inner frusto-conical surfaces complementary to those of the ball seat members and an outer cylindrical surface fitting within the bore of said housing, a threaded plug sealing the bottom of said housing below the segments and seat members, and means cooperating with the threaded plug and with said wedge-like segments for longitudinally shifting said wedge-like segments relative to said ball seat members to compensate for wear.

3. A ball joint connection comprising a ball stud having a shank smaller than the ball, a housing having a cylindrical bore threaded at one end and an apertured end closure, the aperture being sufficiently large only to admit the shank of said ball stud, ball seat members in said housing having frusto-conical outer surfaces, wedge-like segments having inner frusto-conical surfaces complementary to those of the ball seat members and an outer cylindrical surface fitting within the bore of said housing, a threaded plug seating in said housing below the elements therein, and a resilient member interposed between said plug and the bottoms of said wedge-like segment for shifting said wedge-like segments to force the seat members against the ball of said ball stud.

4. A ball joint connection comprising a ball stud having a shank smaller than the ball, a housing having a cylindrical bore and an apertured end closure, the aperture being sufficiently large only to admit the shank of said ball stud, ball seat members in said housing having frusto-conical outer surfaces, wedge-like segments having inner frusto-conical surfaces complementary to those of the ball seat members and an outer cylindrical surface fitting within the bore of said housing, means preventing rotation of the ball seat members and said segments in said housing, and means for longitudinally shifting said wedge-like segments relative to said ball seat members to force said seat members against the ball of said ball stud.

5. A ball joint connection comprising a ball stud, a housing for the ball end thereof, said housing having a cylindrical bore therein and open and threaded at the bottom, ball seat members in said housing having frusto-conical outer surfaces, wedge-like segments having inner and outer surfaces complementary to the outer surfaces of the ball seat members and the bore of the housing respectively, a threaded plug sealing the bottom of said housing below the segments and seat members, and resilient means cooperating with the threaded plug and said wedge-like segments for longitudinally adjusting the positions of said wedge-like segments relative to the ball seat members.

6. A ball joint connection comprising a ball stud, a housing for the ball end thereof, said housing having a cylindrical bore therein, and open and threaded at the bottom, ball seat members in said housing having frusto-conical outer surfaces, wedge-like segments having inner and outer surfaces complementary to the outer surfaces of the ball seat members and the bore of the housing respectively, a threaded plug seated in said housing below the members and segments therein, and a resilient member interposed between said plug and the bottoms of said wedge-like segments for shifting said segments to thereby force said seat members against the ball of said ball stud.

7. A ball joint connection comprising a ball stud, a housing for the ball end thereof, said housing having a cylindrical bore therein open at the bottom, ball seat members in said housing having frusto-conical outer surfaces, wedge-like segments having inner and outer surfaces complementary to the outer surfaces of the ball seat members and the bore of the housing respectively, means preventing rotation of ball seat members and said segments in said housing, and means for longitudinally adjusting the positions of said wedge-like segments relative to the ball seat members to thereby force said seat members against the ball of said ball stud.

8. A ball joint comprising an inverted cup-shaped housing having an apertured top and an open bottom, a ball stud in said housing with its shank projecting through the aperture in the top of said housing, ball seats surrounding the ball of said stud, wedge-shaped members between said seat and housing, a threaded plug closing the open end of said housing, and resilient means bearing against said plug and wedge-shaped members whereby said members are shifted longitudinally to force said ball seats against the ball of said ball stud.

9. A ball joint comprising an inverted cup-shaped housing having an apertured top and an open bottom, a ball stud in said housing with its shank projecting through the aperture in the top of said housing, ball seats surrounding the ball of said stud, wedge-shaped members between said seats and said housing, means for preventing the rotation of said seats and said wedge-shaped members, a threaded plug closing the open bottom of said housing, and resilient means bearing against said plug and wedge-shaped members whereby said members are shifted longitudinally to force said ball seats against the ball of said ball stud.

10. A device as in claim 16 wherein the elements forming the ball seats are circumferentially spaced from each other as well as the elements forming said wedge-shaped members and set-screws project from said housing into said spaces to prevent rotation of the seat members and the wedge-shaped members.

11. A ball joint for tie rods of automotive vehicles, comprising a ball stud having a spherical ball, a housing for said ball having an inner cylindrical surface, ball seats circumferentially spaced about said ball and having segmental spherical inner surfaces engaging said ball, wedge-like members movably disposed between said seat members and the inner cylindrical wall of said housing and resilient means urging said wedge-like members in the direction of their thinner ends to effect closer contact between the spherical surfaces of said ball and seat members.

12. A ball joint for tie rods of automotive vehicles, comprising a ball stud having a spherical ball, a housing having a cylindrical bore provided at one end with an inturned annular flange defining an opening for the shank of said ball stud and open at the other end, seat members spaced circumferentially about said ball and having segmental spherical inner bearing surfaces in contact with said ball, said seat members abutting said annular flange, wedge-shaped members movably disposed between said seat members and the inner wall of said housing and having conforming surfaces in contact therewith, a closure member for the open end of said housing and resilient means held under compression between said closure member and the thicker ends of said wedge-shaped members for urging said wedge-shaped members in the direction of their thinner ends to automatically compensate for wear between engaging bearing surfaces.

13. A ball joint for tie rods of automotive vehicles, comprising a ball stud having a spherical ball, a housing, a cylindrical bore provided at one end with an inturned annular flange defining an opening for the shank of said ball stud and open at the other end, seat members spaced circumferentially about said ball and having segmental spherical inner bearing surfaces in contact with said ball, said seat members abutting said annular flange, wedge-shaped members movably disposed between said seat members and the inner wall of said housing and having conforming surfaces in contact therewith, a closure member for the open end of said housing, resilient means held under compression between said closure member and the thicker ends of said wedge-shaped members for urging said wedge-shaped members in the direction of their thinner ends to automatically compensate for wear between engaging bearing surfaces, and means extending into the spaces between said seat members to prevent said seat members from turning.

14. A ball joint, comprising a ball stud having a spherical ball, a housing for said ball having a cylindrical bore provided at one end with an inturned peripheral flange defining a reduced opening for the shank of said ball stud and open at the other end, spaced ball seats engaging said ball and abutting said inturned peripheral flange and having outer arcuate surfaces, similarly spaced wedge-shaped members movably disposed between said ball seats and the wall of the housing, said wedge-shaped members having outer cylindrical surfaces conforming to the housing wall and having inner arcuate surfaces conforming to the outer arcuate surfaces of said ball seats, said arcuate surfaces being inclined outwardly toward said housing wall in the direction of said peripheral flange, a closure for the open end of said bore and a spring under compression disposed between said closure and the larger bases of said wedge-shaped members to urge them toward said peripheral flange.

15. A ball joint, comprising a ball stud having a spherical ball, a housing for said ball having a cylindrical bore provided at one end with an inturned peripheral flange defining a reduced opening for the shank of said ball stud and open at the other end, spaced ball seats engaging said ball and abutting said inturned peripheral flange and having outer arcuate surfaces, similarly spaced wedge-shaped members movably disposed between said ball seats and the wall of the housing, said wedge-shaped members having outer cylindrical surfaces conforming to the housing wall and inner arcuate surfaces conforming to the outer arcuate surfaces of said ball seats, said arcuate surfaces being inclined outwardly toward said housing wall in the direction of said peripheral flange, a closure for the open end of said bore, a spring under compression disposed between said closure and the larger bases of said wedge-shaped members to urge them toward said peripheral flange, and means extending into the spaces between said ball seats and wedge-shaped members to prevent rotation thereof relative to said housing.

In testimony whereof, we have hereunto subscribed our names.

GEO. H. HUFFERD.
FREDERICK C. CRAWFORD.
MATTHEW P. GRAHAM.